United States Patent [19]
Kuszyk et al.

[11] Patent Number: 5,215,666
[45] Date of Patent: Jun. 1, 1993

[54] CERAMIC COMPOSITE AND METHODS OF MAKING THE SAME

[75] Inventors: Jack A. Kuszyk; Christopher R. Kennedy, both of Newark, Del.

[73] Assignee: Lanxide Technology Company, LP, Newark, Del.

[21] Appl. No.: 902,515

[22] Filed: Jun. 22, 1992

Related U.S. Application Data

[60] Continuation of Ser. No. 763,476, Sep. 20, 1991, abandoned, which is a continuation of Ser. No. 414,198, Sep. 28, 1989, abandoned, which is a division of Ser. No. 2,048, Jan. 12, 1987, Pat. No. 4,874,569.

[51] Int. Cl.$^5$ ............................................. B22D 41/32
[52] U.S. Cl. ................................. 222/591; 222/600; 501/127
[58] Field of Search .................. 222/600, 591, 606; 501/127; 266/280, 283, 286

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,573,616 | 3/1986 | Shapland | 222/600 |
| 4,597,514 | 7/1986 | Thrower | 222/600 |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 0193292 | 9/1986 | European Pat. Off. . |
| 0245192 | 11/1987 | European Pat. Off. . |

OTHER PUBLICATIONS

INCO Publication "Properties of Some Metals and Alloys" Nov. 1968 The International Nickel Company Inc. pp. 14–15.

"Oxidation of Molten Aluminum Alloys, Reaction with Refractories"–M. Drouzy and M. Richard–Mar., 1974 Fonderie, France No. 332 pp. 121–128.

"Refractories for Aluminum Alloy Melting Furnaces'–'–B. Clavaud and V. Jost–Sep., 1980–Lillian Brassinga (from French) Jan., 1985.

*Primary Examiner*—Scott Kastler
*Attorney, Agent, or Firm*—Mark G. Mortenson; Jeffrey R. Ramberg

[57] ABSTRACT

A refractory component for use in contact with molten metal comprising a ceramic matrix which is three-dimensionally interconnected, said matrix comprising an oxidation reaction product of aluminum parent metal, said ceramic matrix containing less than about 0.5% by weight residual parent metal, said ceramic matrix embedding at least one filler material, thereby forming a ceramic composite body, said ceramic composite body having a porosity which is interconnected, said interconnected porosity comprising openings having a mean diameter of less than about 6 microns.

24 Claims, 1 Drawing Sheet

CERAMIC COMPOSITE AND METHODS OF MAKING THE SAME

This is a continuation of copending application Ser. No. 07/763,476 filed on Sep. 20, 1991 which was a continuation of U.S. patent application Ser. No. 07/414,198, filed on Sep. 28, 1989, now abandoned, which in turn was a divisional of U.S. patent application Ser. No. 07/002,048, which issued on Oct. 17, 1989, as U.S. Pat. No. 4,874,569.

BACKGROUND OF THE INVENTION

1. Field of the Invention

The present invention broadly relates to novel ceramic composites and methods of making the same. In a more specific aspect, the invention relates to ceramic composites particularly useful as refractories, such as steel plant refractories. The invention also relates to methods of making the ceramic composites by the directed oxidation at elevated temperatures of a parent metal into a permeable mass of filler material followed by a subsequent heating step to remove or oxidize residual non-oxidized metal constituents.

2. Description of Commonly Owned Patents and Patent Applications and Background

The subject matter of this application is related to commonly owned U.S. Pat. No. 4,713,360 which issued on Dec. 15, 1987 and was based on commonly owned U.S. patent application Ser. No. 818,943, filed Jan. 15, 1986, which is a continuation-in-part of Ser. No. 776,964, filed Sep. 17, 1985, now abandoned which is a continuation-in-part of Ser. No. 705,787, filed Feb. 26, 1985, now abandoned which is a continuation-in-part of Ser. No. 591,392, filed Mar. 16, 1984, now abandoned all in the name of Marc S. Newkirk et al. and entitled "Novel Ceramic Materials and Methods for Making the Same". This patent disclose the method of producing self-supporting ceramic bodies grown as the oxidation reaction product from a parent metal precursor. Molten parent metal is reacted with a vapor-phase oxidant to form an oxidation reaction product, and the metal migrates through the oxidation reaction product toward the oxidant thereby continuously developing a polycrystalline ceramic body of the oxidation reaction product. The ceramic body can be produced having metallic components and/or porosity, which may or may not be interconnected. The process may be enhanced by the use of an alloyed dopant, such as in the case of an aluminum parent metal oxidized in air. This method was improved by the use of external dopants applied to the surface of the precursor metal as disclosed in commonly owned U.S. patent applications Ser. No. 220,935, filed Jun. 23, 1988, now U.S. Pat. No. 4,853,352 which is a continuation of Ser. No. 822,999, filed Jan. 27, 1986, which is a continuation-in-part of Ser. No. 776,965, filed Sep. 17, 1985, now abandoned which is a continuation-in-part of Ser. No. 747,788, filed Jun. 25, 1985, now abandoned which is a continuation-in-part of Ser. No. 632,636, filed Jul. 20, 1984, now abandoned all in the name of Marc S. Newkirk et al., and entitled "Methods of Making Self-Supporting Ceramic Materials".

The subject matter of this application is also related to that of commonly owned U.S. patent applications Ser. No. 819,397, filed Jan. 17, 1986, now U.S. Pat. No. 4,851,375 which is a continuation-in-part of Ser. No. 697,876, filed Feb. 4, 1985, now abandoned both in the name of Marc S. Newkirk et al. and entitled "Composite Ceramic Articles and Methods of Making the Same". This patent discloses a novel method for producing self-supporting ceramic composites by growing an oxidation reaction product from a parent metal into a permeable mass of filler, thereby infiltrating the filler with a ceramic matrix.

Further developments of the foregoing methods enable the formation of ceramic composite structures which (1) contain therein one or more cavities which inversely replicate the geometry of a shaped precursor parent metal, and (2) have a negative pattern which inversely replicates the positive pattern of a parent metal precursor. These methods are described, respectively, (1) in commonly owned U.S. patent application Ser. No. 823,542 filed Jan. 27, 1988, now U.S. Pat. No. 4,828,785 in the name of Marc S. Newkirk et al. entitled "Inverse Shape Replication Method of Making Ceramic Composite Articles and Articles Obtained Thereby", and (2) in commonly owned U.S. patent application Ser. No. 896,157 filed Aug. 13, 1986, now U.S. Pat. No. 4,859,640 in the name of Marc S. Newkirk, and entitled "Method of Making Ceramic Composite Articles with Shape Replicated Surfaces and Articles Obtained Thereby".

Also, methods of making ceramic composite structures having a pre-selected shape or geometry were developed. These methods include the utilization of a shaped preform of permeable filler into which the ceramic matrix is grown by oxidation of a parent metal precursor, as described in commonly owned U.S. patent application Ser. No. 861,025, filed May 8, 1986, in the name of Marc S. Newkirk et al. and entitled "Shaped Ceramic Composites and Methods of Making the Same". Another method of making such shaped ceramic composites includes the utilization of barrier means to arrest or inhibit the growth of the oxidation reaction product at a selected boundary to define the shape or geometry of the ceramic composite structure. This technique is described in commonly owned U.S. patent application Ser. No. 861,024, filed May 8, 1986, in the name of Marc S. Newkirk et al. and entitled "Method of Making Shaped Ceramic Composites with the Use of a Barrier".

The entire disclosures of all of the foregoing commonly owned patent applications and patent are expressly incorporated herein by reference.

Common to each of these commonly owned patent applications and patent is the disclosure of embodiments of a ceramic body comprising an oxidation reaction product, most typically interconnected in three dimensions, and, optionally, one or more non-oxidized constituents of the parent metal or voids or both. The metal phase and/or the voids may or may not be interconnected depending largely on such factors as the temperature at which the oxidation reaction is allowed to proceed, the composition of the parent metal, the presence of dopant materials, etc. For example, if the growth process is continued to substantially exhaust (convert) the metal constituents, porosity will result as a partial or nearly complete replacement of the metal phase throughout the bulk of the composite body, while developing a dense ceramic skin at the surface of the composite body. In such a case, the interconnected porosity is typically accessible from the surface of the ceramic body from which matrix development initiated.

Ceramic refractories are useful as components for applications requiring good resistance to thermal shock, corrosion and erosion in contact with molten metals.

Such components may, for example, be used in control means for regulating the flow of molten metals in molten metal transfer systems, for example, in the manufacture and handling of steel. Such uses include, for example, slide gates, sub-entry nozzles, and ladle shrouds. Slide gates are used for controlling the flow of molten metal from a ladle. Generally, slide gate systems including some rotary designs, consist of a fixed nozzle attached to and within a movable plate. The flow of molten metal from a ladle is controlled by moving the movable plate to fully or partially align openings. When filling the ladle and during shut-off, the openings are misaligned. The principal advantage of the slide gate system over a conventional stopper rod system is its improved reliability of shutoff, ability to modulate molten metal flow, and lack of aspiration of the molten steel product stream. However, even the best slide gate systems, such as high-alumina slide gate systems, are inadequate for certain molten metals, such as specialty steel like low-carbon, high-manganese grades. These corrosive steel compositions will seriously attack the bonding media used in most high-alumina grade slide gate systems.

Today, in the United States market, the majority of the slide gate refractories are composed of either tar-impregnated high-alumina, or fired magnesia materials. However, such slide gate refractories do not possess the thermal shock, corrosion and erosion resistance criteria to stand up to long ladle holding and teeming times and preheating, and therefore have a short service life.

The ceramic composites of this invention offer potential for use as steel plant refractories such as slide gate refractories, that do not have the foregoing deficiencies while still possessing thermal shock, corrosion and erosion resistance criteria to withstand long ladle holding and teeming times and preheating. In addition, they may be useful for other applications requiring thermal shock resistance and high temperature strength retention.

SUMMARY OF THE INVENTION

In accordance with the present invention, there is provided a method for producing a self-supporting ceramic composite comprising (1) a ceramic matrix obtained by oxidation of a parent metal comprising an aluminum-zinc alloy to form a polycrystalline material consisting essentially of an oxidation reaction product of the parent metal with an oxidant, and (2) a filler embedded by the matrix.

Generally, a precursor metal and permeable mass of filler are oriented relative to each other so that the growth of a polycrystalline material resulting from the oxidation of a precursor metal (hereinafter referred to as the "parent metal" and defined below) as described in the above-referenced commonly owned patents patent applications is directed towards and into a permeable mass of filler material. (The terms "filler" and "filler material" are used herein interchangeably.) The mass of filler has at least one defined surface boundary and is infiltrated with polycrystalline material to the defined surface boundary to provide a ceramic composite. Under the process conditions of this invention, the molten parent metal oxidizes outwardly from its initial surface (i.e., the surface exposed to the oxidant) towards the oxidant and into the mass of filler by migrating through its own oxidation reaction product. The oxidation reaction product grows into the permeable mass of filler. This results in novel ceramic matrix composites comprising a matrix of a ceramic polycrystalline material embedding the filler materials.

The parent metal used in the ceramic matrix growth process comprises an aluminum alloy having at least about 1% by weight zinc, and this parent metal is heated to a first temperature above its melting point but below the melting point of the oxidation reaction product thereby forming a body or pool of molten parent metal which is reacted with an oxidant, preferably a vapor-phase oxidant, e.g., air, to form the oxidation reaction product. At this first temperature or within this first temperature range, the body of molten metal is in contact with at least a portion of the oxidation reaction product which extends between the body of molten metal and the oxidant. Molten metal is drawn through the oxidation reaction product towards the oxidant and towards and into the mass of filler material to sustain the continued formation of oxidation reaction product at the interface between the oxidant and previously formed oxidation reaction product. The reaction is continued for a time sufficient to infiltrate the filler material to the defined surface boundary with the oxidation reaction product by growth of the latter, which has therein inclusions of non-oxidized metallic constituents of the parent metal.

The resulting ceramic composite comprises a filler and a ceramic matrix which is a polycrystalline oxidation reaction product and contains residual non-oxidized constituents of the parent metal, most typically aluminum and zinc but also may include other metals as well. The ceramic composite is heated to a second temperature (or within this second temperature range) above the first temperature, but below the melting point of the oxidation reaction product, in order to remove or oxidize at least a substantial portion of the residual non-oxidized metallic constituents, as by volatilization or oxidation of the metal constituents, from the polycrystalline material without substantial formation of the oxidation reaction product beyond the defined surface boundary. Heating to this second temperature may be carried out either in a vacuum, an inert atmosphere, or more preferably, an oxygen-containing atmosphere or, most preferably, air. Some of the removed metal phase is replaced essentially by porosity or voids. Other metal phases are oxidized in situ, converting the metal to an oxidized species. The final structure comprises a ceramic matrix and filler material, and the ceramic matrix consists essentially of oxidation reaction product and interconnected porosity with at least a portion being accessible from one or more surfaces of the ceramic composite. Preferably, the surface porosity is characterized by openings having a mean diameter of less than about 6 microns, which prevents the penetration of some materials such as molten steel.

The products of the present invention are essentially ceramic; that is, essentially inorganic and substantially void of metal, although there may be some inclusions or islands of metal. The products are adaptable or fabricated for use as refractories, which, as used herein, are intended to include, without limitation, industrial slide gate valve refractories that slidably contact the bottom portion of a vessel, ladle or the like, containing molten metal, such as steel, to permit and regulate the flow of molten metal through an aperture in the ladle.

As used in this specification and the appended claims, "oxidation reaction product" means the product of reaction of metals with an oxidant thereby forming an oxide compounds.

As used herein and in the claims, "oxidant" means one or more suitable electron acceptors or electron sharers and may be a solid, a liquid or a gas (vapor), or some combination of these at the process conditions.

The term "parent metal" as used in this specification and the appended claims refers to that aluminum alloy metal having typically at least about 1 to 10 percent by weight zinc and which is the precursor of the polycrystalline oxidation reaction product and includes that aluminum alloy metal, and commercially available aluminum alloy metal having typically at least about 1 to 10 percent by weight zinc, as well as impurities and/or alloying constituents therein.

DETAILED DESCRIPTION OF THE INVENTION

Figure 1:
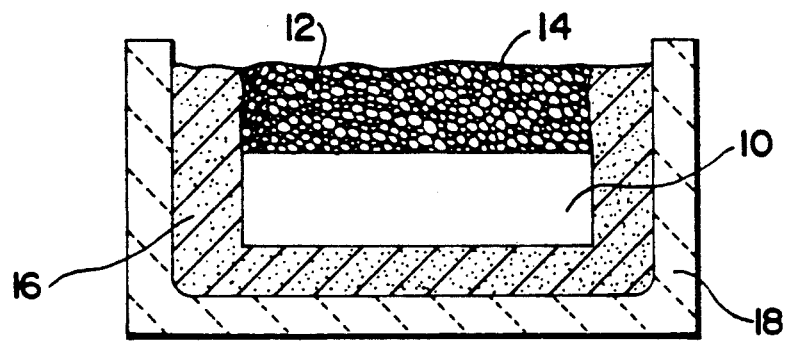
FIG. 1 is a schematic cross-sectional view in elevation showing an assembly of an aluminum alloy parent metal, overlaying filler material and a support bed contained in a refractory crucible.

Referring to the drawings for the practice of the present invention, in FIG. 1 a parent metal 10, comprising an aluminum alloy having at least about 1 to about 10 percent by weight zinc, is formed into an ingot, billet, rod, plate or the like. This body of parent metal 10 and a permeable mass of filler material 12 having at least one defined surface boundary 14 are positioned adjacent to each other and oriented with respect to each other so that growth of the oxidation reaction product will be into the filler material 12 and in a direction towards the defined surface boundary 14 in order that the filler material 12, or a part thereof, will be infiltrated by the growing oxidation reaction product. The parent metal 10 and filler material 12 are embedded in a suitable support material 16 substantially inert under the process conditions and of such constituency so that oxidation reaction will not proceed into this bedding, and the upper or exposed surface of the mass of filler is flush with the surface of the bedding. Suitable bedding materials include, for example, certain grades of particulate alumina such as 38 Alundum manufactured by Norton Company. The assembly or lay-up is contained in a suitable refractory vessel or crucible 18.

The filler material 12 preferably comprises ceramic or refractory material and may be a lattice or array of a bed of particulates, granules, powders, aggregate, refractory fiber cloth, fibers, tubes, tubules, pellets, whiskers, or the like, or a combination of the foregoing. The array or arrangement of filler material(s) 12 may be either loose or bonded and has interstices, openings, intervening spaces, or the like, to render it permeable to the oxidant and to the oxidation reaction product growth. Further, suitable filler(s) depending upon specific end use of the product, may include for example, metal oxides, borides, nitrides, or carbides of a metal selected from the group consisting of aluminum, cerium, hafnium, lanthanum, silicon, neodymium, praseodymium, samarium, scandium, thorium, uranium, titanium, yttrium, and zirconium. Certain of these fillers may required protective coatings to prevent their reaction and/or oxidation under the conditions of the process. In one embodiment of the invention, the filler includes from about 3 percent to 10 percent by weight of silica, such as in combination with alumina. Alumina filler found especially useful has a mesh size of from about 5 to 500 (U.S. standard sieve). Silicon carbide as filler may have a mesh size of from about 500 to about 1000 (U.S. standard sieve).

The assembly is, in any case, arranged so that growth of the oxidation reaction product will occur into the filler material 12 such that void space between filler particles will be substantially filled by the grown oxidation reaction product. A matrix of the polycrystalline material resulting from the oxidation reaction product growth is simply grown into and/or around the filler material 12 so as to embed and infiltrate the latter preferably to its defined surface boundary 14 without substantially disturbing or displacing the filler material 12. Thus, no external forces are involved which might damage or disturb the arrangement of the filler material 12 and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated by the present invention.

A solid, liquid, or vapor-phase oxidant, or a combination of such oxidants may be employed. Vapor-phase oxidants include, without limitation, oxygen, oxygen-argon, or other inert gas mixtures and air.

Solid oxidants include reducible oxides such as silica, tin oxide, or zinc oxide. When a solid oxidant is employed, it is usually dispersed through the entire bed of filler or through a portion of the bed adjacent to the parent metal, in the form of particulates admixed with the filler, or perhaps as coatings on the filler particles.

If a liquid oxidant is employed, the entire bed of filler or a portion thereof adjacent to the molten metal is coated or soaked as by immersion in the oxidant to impregnate the filler. A suitable liquid oxidant includes low melting glasses.

Zinc as a dopant material (which is described below in greater detail) promotes or facilitates growth of the oxidation reaction product and subsequent removal of the non-oxidized metallic constituents from the oxidation reaction product initially formed. The zinc dopant is alloyed into the aluminum parent metal, and comprises from about 1 percent by weight to about 10 percent by weight, and preferably about 4 percent to about 7 percent by weight. Additional dopant materials (as disclosed in the aforementioned commonly owned patent applications and patent) may be used in conjunction with the parent metal 10 as by alloying dopant material with the parent metal 10, applying an external coating to the surface of the parent metal 10, or by incorporating or mixing the dopant materials with the filler material(s) 12. For example, magnesium may be used to augment the dopant action of zinc.

Referring to FIG. 1, a body of aluminum parent metal 10 along with the mass of permeable filler material 12 are positioned in a crucible or other refractory container 18 such that at least one metal surface of the parent metal 10 is exposed to the adjacent to or surrounding mass of filler material 12. If a vapor-phase oxidant is used, the mass of filler is permeable to the gaseous oxidant present in the oxidizing atmosphere (typically air at ambient atmospheric pressure). The resulting assembly is then heated to a first temperature range in the presence of the oxidant in a suitable furnace (not shown in the drawings) to elevate the temperature thereof in the region, typically, with air as the oxidant, between about 850° C. to about 1450° C., or more preferably, between about 950° C. to about 1100° C. to form a pool or body of molten parent metal. The temperature region depends upon the filler material 12, dopant or dopant concentrations, oxidant, or the combination of any of these. At this temperature region parent metal 10 transport begins to occur through the oxide skin normally protecting the aluminum parent metal.

The continued high temperature exposure of the parent metal 10 to the oxidant allows the continued oxidation of parent metal 10 to form a polycrystalline oxidation reaction product of increasing thickness. This growing oxidation reaction product progressively infiltrates the permeable mass of filler material 12 with an interconnected oxidation reaction product matrix which also may contain non-oxidized parent metal constituents, thus forming a cohesive composite. The growing polycrystalline matrix impregnates or infiltrates the filler material 12 at a substantially constant rate (that is, a substantially constant rate of thickness increase over time), provided there is a relatively constant source of oxidant, for example, by allowing a sufficient interchange of air (or oxidizing atmosphere) in the furnace. Interchange of oxidizing atmosphere, in the case of air, can be conveniently provided by vents in the furnace. Growth of the matrix continues for a time sufficient for the polycrystalline oxidation reaction product to infiltrate the mass of filler material 12 to the defined boundary 14, which preferably occurs when substantially all of the parent metal 10 is consumed, i.e., substantially all of the parent metal 10 has been converted into the matrix.

The ceramic composites initially produced by the oxidation of the aluminum alloy parent metal with the oxidant comprises the filler material(s) infiltrated and embedded, preferably to the defined boundary, with the polycrystalline oxidation reaction product of the parent metal with the oxidant, and one or more non-oxidized metallic constituents of the parent metal including aluminum and zinc, and other metals depending on the parent metal composition. The volume percent of residual metal (non-oxidized metallic constituents) can vary over a wide range depending on whether or not the oxidation reaction process is conducted largely to exhaust aluminum alloy parent metal. By way of example only, a ceramic composite formed from aluminum alloy metal and 50 volume percent filler processed in air at about 1000° C. may contain about 0.5 to 10 volume percent residual metal.

In order to produce a ceramic composite substantially devoid of metallic constituents, such as for a composite used for slide gate valve refractories, the non-oxidized metallic constituents (residual metal) present after the first heat treatment are substantially removed and/or oxidized in situ by a second or subsequent heating step. The initially formed ceramic composite is heated at a temperature higher than the temperature first employed in forming the initial ceramic composite. This second heating step may be accomplished by elevating the temperature to effect the substantial volatilization and/or oxidation of the residual metal. This second heating step may be carried out in any oxygen-containing or inert atmosphere or in a vacuum. An oxygen-containing atmosphere is preferred because removal of residual metal by oxidation thereof can be effected at a lower temperature than removal by volatilization in an inert atmosphere or in a vacuum. Air at ambient atmospheric pressure is most preferred for reasons of economy.

The assembly is heated in the furnace in the presence of the desire atmosphere to elevate the temperature thereof in the region typically between about 1250° C. to about 2000° C.; more preferably at least about 1400° C., or from about 1400° C. to about 1600° C. This temperature is higher or above the temperature that was employed to produce the initially formed ceramic composite. At these elevated temperatures, any residual non-oxidized metallic constituents of the aluminum alloy parent metal are essentially removed or converted to an oxide without any further growth beyond the defined surface boundary. It is believed that a majority of the residual non-oxidized metallic constituents are essentially helped to be removed through volatilization of the zinc dopant. Some of the residual aluminum metal will oxidize in situ without effecting the defined boundary of the part. The zinc dopant not only promotes or facilitates growth of the oxidation reaction product, but volatilizes at elevated temperature, generating porosity and high surface area which then promotes oxidation of residual non-oxidized metallic constituents of the aluminum alloy parent metal leaving minimal residual metal in the composite.

As was previously mentioned, the amount of zinc that is to be alloyed into the aluminum parent metal preferably comprises from about 4 percent by weight to about 7% by weight (based on the weight of the aluminum parent metal labelled as 10 in FIG. 1). The zinc may be alloyed directly with unalloyed commercial purity aluminum, e.g., of 99%, 99.5% or 99.7% grade. If so desired, high or super purity aluminum, e.g., 99.9% or purer, may be used as a base for the alloying addition. This may be desirable where the refractory end-product is to be used in conjunction with very high purity molten metals where even traces of contaminants are unwanted. On the other hand, certain zinc-containing commercial wrought alloys, e.g., of the Aluminum Association 7000 series or casting alloys, e.g., of the Aluminum Association 700 series may be used where the zinc content is above 1.0%, preferably above 4.0%, and where the presence of other alloying elements is not harmful to the end use. For example, alloy 7021 which contains 5.0–6.0% zinc, 1.2–1.8% magnesium, 0.08–0.18% zirconium with permitted maxima for the following elements: silicon 0.25%; iron 0.40%; copper 0.25%; manganese 0.10%; chromium 0.05%; titanium 0.10%; other elements each 0.05% up to a total of 0.15% (all percentages by weight) the balance being aluminum, is one among several such alloys which would comprise a suitable parent metal for the invention. In this case, the magnesium present in the alloy augments the dopant action of zinc.

When desired, the composite may be cooled and removed from the furnace. The cooled body may then be machined (e.g., such as by milling, polishing, grinding or the like) on one or more surfaces to desired tolerances. This alternative may be particularly desirable in the manufacture of ceramic articles requiring close tolerances.

Figure 2:
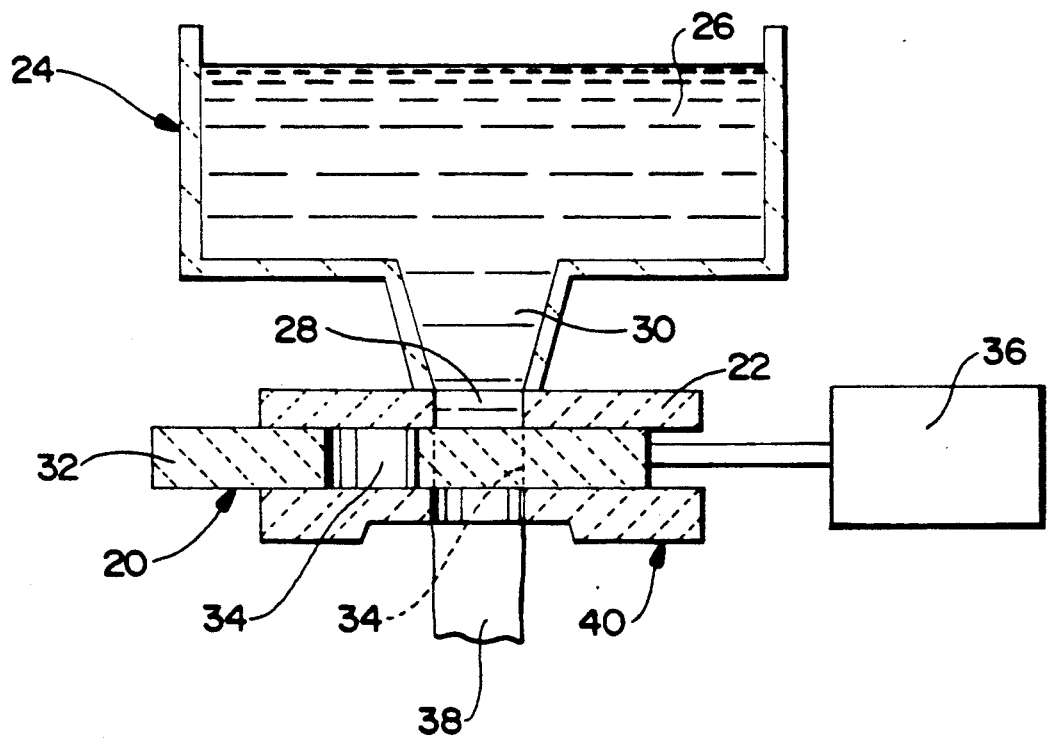
FIG. 2 is a partial schematic, vertical cross-sectional view showing a slide gate valve, slidably disposed between a top plate of the bottom portion of a ladle and a tube holder that holds a tube through which molten metal passes after leaving the ladle.

In one preferred embodiment of the present invention, displayed in FIG. 2 the ceramic composites of the invention can be fabricated for use as slide gate valve refractories. The slide gate valve, generally illustrated as 20 in FIG. 2, contacts a top plate 22 or the bottom portion of a ladle, generally illustrated as 24, containing molten metal 26 (i.e., molten steel). Top plate 22 is integrally bound to the ladle 24 and has a top plate aperture 28 which is in direct communication with a ladle aperture 30 disposed in the bottom of the ladle 24. The slide gate valve 20 has a slide gate structure 32 with at least one slide gate aperture 34. A drive means 36, such as a throttling cylinder, or the like, is coupled to the slide gate 20 to slide (or rotate) the slide gate along the bottom surface of the top plate 22 to either align or misalign the slide gate aperture 34 with the top plate aperture 28 and the ladle aperture 30. A tube holder means, generally illustrated as 40, holds a tube 38 and supports the slide gate valve 20, the top plate 22, and the ladle 24 that is bound to the top plate 22. Tube 38 conducts the flow of molten metal 26 after the same leaves ladle 24 through slide gate 20. If the slide gate valve refractory 20 is disposed by the drive means 36 such that the aperture 34 of the slide gate valve refractory 20 is totally misaligned with top plate aperture 28 and with ladle aperture 30 of the ladle 24, molten metal 26 will not flow from the ladle 24. Also, molten metal 26 (as will be explained in greater detail hereinafter) will not penetrate into and through the porosity of the ceramic matrix in the structure 32 of the slide gate valve 20. As depicted in FIG. 2 by the label 34 which is connected to a dotted line, when the slide gate valve 20 is slidably positioned along the top plate 22 and the bottom portion of the ladle 24 such that the slide gate aperture 34 is generally aligned with the top plate aperture 28 and with ladle aperture 30 of the ladle 24, molten metal 26 will flow by gravity from the ladle 24 through the respective apertures into the tube 38.

The slide gate structure 32 must be extremely flat, i.e., to within tolerances of 1/2000 of an inch or less, and must be held tightly against the bottom surface of the top plate 22 so that molten metal will not leak out between the contacting surfaces. The slide gate structure 32, as well as the structure of the top plate 22, is composed of refractory materials or components that are capable of being machined (such as by milling, grinding, polishing, or the like) extremely smooth so the structure of the top plate 22 and the structure 32 of the slide gate valve 20 cannot pull out the grains of the other during opening and closing of the slide gate valve 20 with the coupled drive means 36. The structure 32 of the slide gate valve 20 should not have pores which are too large since molten metal would penetrate the pores and weaken the structure 32. Furthermore, the slide gate structure 32 must possess extremely good thermal shock resistance and must be composed of refractory materials or components that are strong enough to resist chemical corrosion and erosive effects from flowing molten metal compositions. In order to fabricate a slide gate structure 32 from a ceramic composite possessing the foregoing properties and/or criteria, the ceramic composite should contain a ceramic matrix substantially consisting essentially of non-metallic and inorganic material(s). Any substantial amount of non-oxidized metallic constituents within a ceramic composite, such as aluminum, could be detrimental to the performance of the material by lowering its high temperature strength, possibly exhibiting oxidation overgrowth beyond the slide gate dimensions and causing the gate components to bond together, as well as affecting thermal shock performance. Hence, the slide gate valve 20 would fail in its function or have to be replaced after minimal use, most likely due to spalling, cracking, or surface overgrowth.

The ceramic composite structure obtained after removing and/or oxidizing substantially all of the residual non-oxidized metallic constituents of the aluminum parent metal is a coherent ceramic composite typically having from about 5% to about 98% by volume of the total volume of the composite structure comprised of one or more of the filler material embedded within a polycrystalline ceramic matrix. The polycrystalline ceramic matrix is comprised of about 94.5% or more by weight (of the weight of polycrystalline oxidation reaction product) of interconnected alpha-alumina, about 5% or less of zinc aluminate, and about 0.5% or less by weight of non-oxidized metallic constituents of the aluminum parent metal.

The polycrystalline ceramic matrix exhibits some porosity ranging from about 2% by volume to about 25% by volume of polycrystalline ceramic matrix, preferably not more than about 10%. It is believed that some porosity is required in order to provide the desired thermal shock resistance of the refractory product. At least a portion of the porosity is accessible from the surface, and typically about 5% of such porosity have pore openings whose diameter measures from about 1 micron to about 8 microns. Preferably, the openings of the porosity accessible from the surface have a means diameter of about 6 microns or less, where 6 is the means of a normal Gaussian distribution curve. An alumina-based ceramic composite having openings on its surface that measure about 6 microns or less in diameter is particularly useful in fabricating a slide gate refractory since molten steel will not penetrate its structure.

The ceramic composite structure of this invention possesses the following properties: a three-point bend test for hot Modulus of Rupture (MOR) of from about 3500 psi to about 6500 psi at 2550° F. (1400° C.) in $N_2$, depending on the size of the alumina filler material; a thermal shock resistance parameter (resistance to crack propagation, Rst) of about 60° F./in.$^{\frac{1}{2}}$; a volume stability (thermal expansion in accordance with ASTM E228.71 from room temperature to 1500° C. and then cooled) of 0.15% or less in linear change with no rate changes that result in cracking or distortion; and a corrosion resistance (air/metal line wear in inches with a major diagonal 1 × 1 inch bar, 20 min. spin test, Al-killed steel, as described in the example below) of 0.04 inch or less.

The ceramic composite of this invention exhibits substantially clean grain boundaries wherein the grain boundaries at the interconnection of the crystallites have no other phase present. Most notably, the grain boundaries are devoid of any siliceous phase. This feature is particularly important for steel plant refractories. Low-melting silicates are found in almost every traditional alumina refractory, and this material reacts with the molten iron causing dissolution into the liquid steel and ultimately leading to cracking, spalling and failure of the structure.

In addition, the composites of the present invention do not require extra precautions to prevent oxidation of the bonding phase because it is a fully oxidized matrix, which is in contrast to carbon-bonded alumina refractories presently being used in Japan in the slide gate market.

A particularly effective method for practicing this invention involves forming the filler into a preform with a shape corresponding to the desired geometry of the final composite product. The preform may be prepared by any of a wide range of conventional ceramic body formation methods (such as uniaxial pressing, isostatic pressing, slip casting, sedimentation casting, tape casting, injection molding, filament winding for fibrous materials, etc.) depending largely on the characteristics of the filler. Initial binding of the particles prior to infiltration may be obtained through light sintering or by use of various organic or inorganic binder materials which do not interfere with the process or contribute undesirable by-products to the finished material. The preform is manufactured to have sufficient shape integrity and green strength, and should be permeable to the transport of oxidation reaction product, preferably having a porosity of between about 5 and 90% by volume and more preferably between about 25 and 50% by volume. Also, an admixture of filler materials and mesh sizes may be used. The preform is then contacted with molten parent metal on one or more of its surfaces for a time sufficient to complete growth and infiltration of the preform to its surface boundaries.

As disclosed in copending U.S. patent application Ser. No. 861,024, filed on May 9, 1986, in the names of Marc S. Newkirk et al. and entitled "Method of Making Shaped Ceramic Composites with the Use of a Barrier" and assigned to the same owner, a barrier means may be used in conjunction with the filler material or preform to inhibit growth or development of the oxidation reaction product beyond the barrier. After the first heat treating step and before the second heating step, the barrier is removed by any suitable means. Suitable barriers may be any material, compound, element, composition, or the like, which, under the process condition of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (plaster of Paris), calcium silicate, and Portland cement, and mixtures thereof, which typically are applied as a slurry or paste to the surface of the filler material. A preferred barrier comprises a 50/50 admixture of plaster of paris and calcium silicate. These barrier means also may include a suitable combustible or volatile material that is eliminated on heating, or a material which decomposes on heating, in order to increase the porosity and permeability of the barrier means. The barrier is readily removed from the composite as by grit blasting, grinding, etc.

As a result of using a preform, especially in combination with a barrier means, a net shape is achieved, thus minimizing or eliminating expensive final machining or grinding operations.

As a further embodiment of the invention and as explained in the commonly owned patent applications and patent, the addition of dopant materials in conjunction with the parent metal can favorably influence the oxidation reaction process. The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions. The dopant(s) used in the process should be substantially removed or oxidized during the second heating step so as to not adversely affect the properties of the end product.

The dopant or dopants used in conjunction with the parent metal (1) may be provided as alloying constituents of the parent metal, (2) may be applied to at least a portion of the surface of the parent metal, or (3) may be applied to the filler bed or preform or to a part thereof, or any combination of two or more of techniques (1), (2) and (3) may be employed. For example, an alloyed dopant may be used in combination with an externally applied dopant. In the case of technique (3), where a dopant or dopants are applied to the filler bed or preform, the application may be accomplished in any suitable manner, such as by dispersing the dopants throughout part or the entire mass of the preform as coatings or in particulate form, preferably including at least a portion of the preform adjacent to the parent metal. For example, silica admixed with an alumina bedding is particularly useful for aluminum parent metal oxidized in air. Application of any of the dopants to the preform may also be accomplished by applying a layer of one or more dopant materials to and within the preform, including any of its internal openings, interstices, passageways, intervening spaces, or the like, that render it permeable.

The invention is further illustrated by the following example.

EXAMPLE

Aluminum Association 712.2 aluminum casting alloy ingot measuring 1 inch by 2½ inches by 8½ inches was placed horizontally upon a layer of a mixture of commercial 8-14 grit pure alumina (Norton Co., 38 Alundum) and 5 weight percent 500-mesh $SiO_2$ (Pennsylvania Glass and Sand Co.) and was subsequently covered with the same material to a depth of approximately three inches. The 712.2 alloy comprised, by weight percent, about 5 to 6.5% zinc, about 0.25% or less copper, about 0.4% to 0.6% chromium, about 0.15% or less silicon, about 0.40% or less iron, about 0.25% or less to 0.50% magnesium, about 0.10% or less manganese, about 0.15% to 0.25% titanium, about 0.20% or less of other metals with the maximum amount of any one other metal being about 0.05% or less, and the balance being aluminum.

The alumina-embedded ingot was contained within a suitable refractory crucible and the entire assembly was placed into an air atmosphere furnace. The furnace allowed the entry of ambient air through natural convection and diffusion through random openings in the furnace walls. The assembly was processed for 144 hours at a setpoint temperature of 1000° C. after allowing an initial eight-hour period for the furnace to reach the setpoint temperature. After the 144 hour heating period, eight additional hours were allowed for the sample to cool to below 600° C., after which the resulting ceramic composite was removed from the furnace. The ceramic composite contained residual zinc, aluminum and silicon.

In order to remove at least a substantial portion of the residual zinc, aluminum, and silicon, the ceramic composite was again contained within a refractory crucible, placed into the air furnace, and was processed for eight hours at a setpoint temperature of 1400° C. after allowing an initial eight-hour period for the furnace to reach the setpoint temperature. After the eight-hour heating period, eight additional hours were allowed for the ceramic composite to cool to below 600° C., after which the ceramic composite was removed from the furnace. The alumina matrix changed from a gray, metallic color to a white color after the second heating step of 1400° C., indicating very little presence of residual metal. The microstructure of the ceramic composite revealed a very homogeneous, porous, fine-grained (approximately 6 micron diameter) alumina matrix. The residual zinc volatilized, effectively driving off any residual aluminum and silicon and providing space for in situ oxidation of some of the aluminum during the second heating step at 1400° C., ultimately creating a more porous, low metal content ceramic composite. The second heating step at 1400° C. caused no further substantial oxidation reaction product growth beyond the original defined boundary of the composite, even though aluminum, zinc, and silicon metals were present prior to a second heating at 1400° C. Bend testing showed a MOR (room temperature) of approximately 4000 psi for the final composite, and a strength retention (MOR) of about 2400 psi after five rapid heat-up and cool-down cycles between room temperature and 1200° C. with ten-minute soak periods at each temperature. X-ray analysis of the ceramic product showed alumina and some minor amounts of zinc aluminate.

To examine the effect of molten steel on this ceramic product, the ceramic product was cut into four pieces and engaged to four sample holders threaded to a bearing-supported shaft of a spin test apparatus consisting of a steel frame holding a variable speed electric motor connected to the bearing-supported shaft. The four pieces of ceramic product were rotated with the sample holders about the central axis of the bearing-supported shaft. The outer edge of each of the ceramic product pieces traveled at 600 inches per minute when rotated at 48 rpm. A sheet grade steel (low carbon, sulfur, phosphorus, and oxygen) was heated to 1593° C. and the surface deslagged prior to the start of the test. The four pieces of ceramic product were heated to 1093° C. and then immersed in the molten steel and rotated at 48 rpm by the spin test apparatus for 20 minutes. The four pieces of ceramic product were removed from the sample holders, cooled, and examined to determine the effect of molten steel upon the ceramic product. It was determined that the ceramic product resisted significant penetration of steel, did not react to any extent with the liquid steel, and did not fracture during the test due to any thermal gradients. Thus, the ceramic composite product appears to be a useful steel refractory, such as for slide gate valves that are in contact with molten steel.

What is claimed is:

1. A refractory component for use in contact with molten metal comprising:
   a) a ceramic matrix which is three-dimensionally interconnected, said ceramic matrix comprising an oxidation reaction product of a parent metal comprising aluminum, said ceramic matrix containing less than about 0.5% by weight residual aluminum parent metal;
   b) said ceramic matrix embedding at least one filler material, thereby forming a ceramic composite body, said ceramic composite body having a porosity which is interconnected, said interconnected porosity comprising openings having a mean diameter of less than about 6 microns.

2. The refractory component of claim 1, wherein said refractory component has a modulus of rupture of about 3500–6500 psi at about 1400° C. in a nitrogen atmosphere.

3. The refractory component of claim 1, wherein said refractory component has a thermal shock resistance of about 60° C./in.$^{\frac{1}{2}}$.

4. The refractory component of claim 1, wherein said refractory component has a volume stability of not greater than about 0.15%.

5. The refractory component of claim 1, wherein said refractory component has a corrosion resistance of not greater than about 0.04 inch.

6. The refractory component of claim 1, wherein said filler material comprises at least one metal oxide, boride or carbide of a metal selected from the group consisting of aluminum, cerium, hafnium, lanthanum, silicon, neodymium, praseodymium, samarium, scandium, thorium, uranium, titanium, yttrium, and zirconium.

7. The refractory component of claim 1, wherein said oxidation reaction product has substantially clean grain boundaries.

8. The refractory component of claim 7, wherein said substantially clean grain boundaries are substantially devoid of any siliceous phase.

9. The refractory component of claim 1, wherein said refractory component is characterized as at least one article selected from the group consisting of a slide gate, a sub-entry nozzle and a ladle shroud.

10. A refractory component for use in contact with molten metal formed by a method comprising:
   a) positioning a parent metal, comprising an aluminum alloy containing at least about 1% by weight zinc, adjacent to a filler material having at least one defined surface boundary and orienting said parent metal and said filler material relative to each other so that formation of an oxidation reaction product of the parent metal with an oxidant will occur into said filler material and in a direction towards said defined surface boundary;
   b) heating said parent metal to a first temperature above its melting point but below the melting point of said oxidation reaction product to form a body of molten parent metal and reacting the molten parent metal with said oxidant at said first temperature to form said oxidation reaction product, and at said first temperature maintaining at least a portion of said oxidation reaction product in contact with and extending between said body of molten metal and said oxidant, to draw molten metal through the oxidation reaction product towards the oxidant and towards and into the adjacent filler material so that fresh oxidation reaction product continues to form within the filler material at an interface between the oxidant and previously formed oxidation reaction product, and continuing said reaction for a time sufficient to infiltrate said filler material to said defined surface boundary, with said ceramic matrix, said ceramic matrix containing at least some residual non-oxidized metallic constituents of said parent metal; and
   c) heating the resulting infiltrated filler material of step (b) in at least one environment selected from the group consisting of an oxygen-containing atmosphere, an inert atmosphere and a vacuum to a second temperature above the first temperature but below the melting point of the oxidation reaction product to remove or oxidize sufficient residual non-oxidized aluminum parent metal without substantial formation of oxidation reaction product beyond said defined surface boundary such that said ceramic matrix contains less than about 0.5% by weight said residual aluminum parent metal, thereby providing said refractory component.

11. The refractory component of claim 1, wherein said component comprises a slide gate valve refractory having a slide gate structure defining at least one slide gate aperture and having a generally planar surface for slidably contacting a ladle means having a ladle aperture and containing molten metal in order to permit and regulate the flow of the molten metal from the ladle means through the ladle aperture and the slide gate aperture.

12. The component of claim 11, wherein said filler material further comprises from about 3% by weight to about 10% by weight silica.

13. The component of claim 10, wherein said filler material further comprises alumina having having a mesh size of from about 5 to about 500.

14. The component of claim 11, wherein at least a portion of said interconnected porosity is accessible from at least one surface of said ceramic matrix.

15. A refractory component for use in contact with molten metal comprising:
  a) a ceramic matrix which is three-dimensionally interconnected, said ceramic matrix comprising an oxidation reaction product of a parent metal comprising aluminum, said ceramic matrix containing less than about 0.5% by weight residual aluminum parent metal;
  b) said ceramic matrix embedding at least one filler material, said filler material comprising at least one metal oxide, boride or carbide of a metal selected from the group consisting of aluminum, cerium, hafnium, lanthanum, silicon, neodymium, praseodymium, samarium, scandium, thorium, uranium, titanium, yttrium, and zirconium, thereby forming a ceramic composite body, said ceramic composite body (1) having a porosity which is interconnected, said interconnected porosity comprising openings having a mean diameter of less than about 6 microns; (2) having a modulus of rupture from about 3500–6500 psi at about 1400° C. in a nitrogen atmosphere; (3) having a thermal shock resistance parameter of about 60° C./in.$\frac{1}{2}$; (4) having a volume stability of not greater than about 0.15%; and (5) having a corrosion resistance of not greater than about 0.04 inch.

16. The refractory component of claim 14, wherein said refractory component is characterized as at least one article selected from the group consisting of a slide gate, a sub-entry nozzle and a ladle shroud.

17. The refractory component of claim 10, further comprising interconnected porosity which comprises a plurality of openings having a mean diameter of less than about 6 microns.

18. The refractory component of claim 1, wherein said refractory component comprises less than about 5 percent by weight zinc aluminate.

19. The refractory component of claim 1, wherein said filler material comprises at least one material selected from the group consisting of aluminum oxide and silicon carbide.

20. The refractory component of claim 1, wherein said filler material comprises at least one material selected from the group consisting of granules, particulates, powders, fibers, whiskers, aggregate, pellets, tubes, refractory fiber cloth, tubules and mixtures thereof.

21. The refractory component of claim 10, wherein said oxidant comprises an oxygen-containing gas and said oxidation reaction product comprises aluminum oxide.

22. The refractory component of claim 10, wherein said first temperature is from about 850° C. to about 1450° C.

23. The refractory component of claim 10, wherein said second temperature is greater than about 1250° C.

24. The refractory component of claim 10, wherein said filler material comprises at least one metal oxide, boride, nitride, or carbide of a metal selected from the group consisting of aluminum, cerium, hafnium, lanthanum, silicon, neodymium, praseodymium, samarium, scandium, thorium, uranium, titanium, yttrium, and zirconium.

* * * * *